MILLS & CHICHESTER.
Grain Separator.
No. 82,431.                                           Patented Sept. 22, 1868.
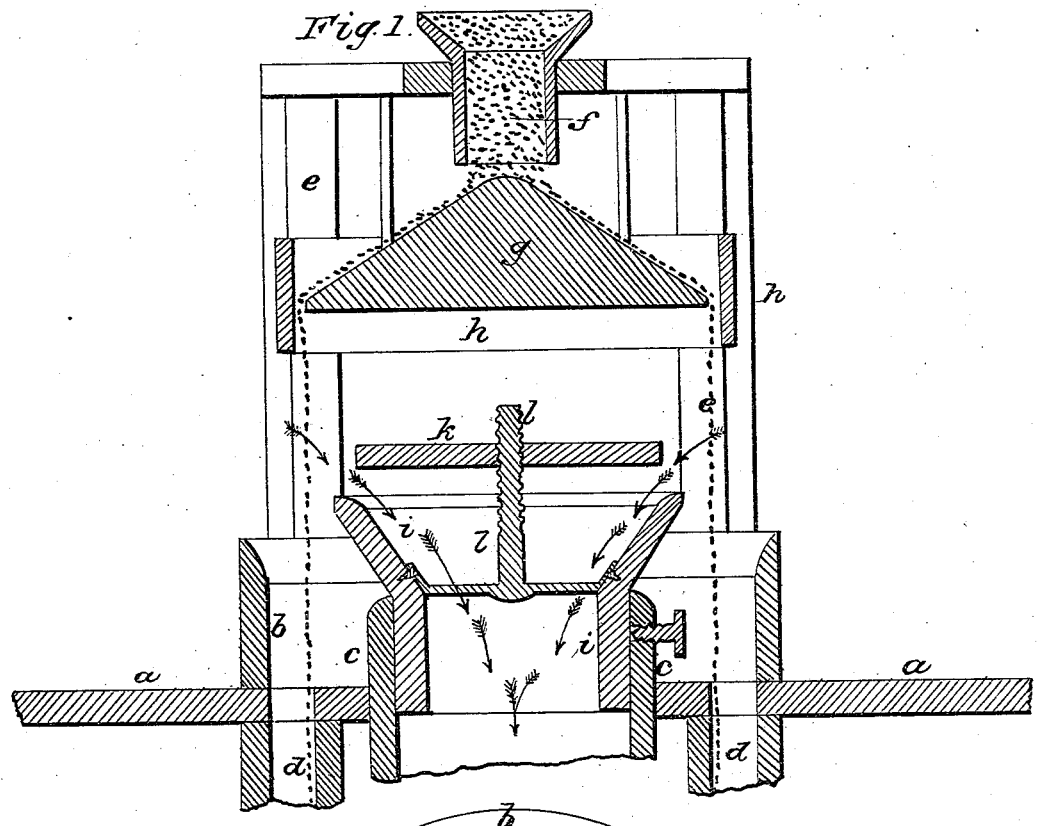
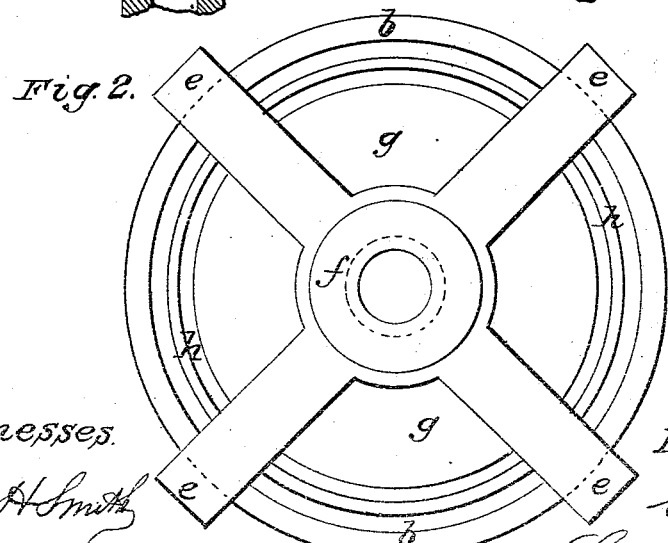

United States Patent Office.

CLARK W. MILLS AND LEWIS S. CHICHESTER, OF BROOKLYN, NEW YORK, ASSIGNORS TO THEMSELVES AND GEORGE H. NICHOLS, OF SAME PLACE.

Letters Patent No. 82,431, dated September 22, 1868; antedated September 14, 1868.

IMPROVEMENT IN GRAIN-SEPARATOR.

The Schedule referred to in these Letters Patent and making part of the same.

TO ALL WHOM IT MAY CONCERN:

Be it known that we, CLARK W. MILLS and LEWIS S. CHICHESTER, of Brooklyn, in the county of Kings, and State of New York, have invented, made, and applied to use, a certain new and useful Improvement in Cleaning and Separating Grain; and we do hereby declare the following to be a full, clear, and exact description of the said invention, reference being had to the annexed drawing, making part of this specification, wherein—

Figure 1 is a vertical section of the said cleaner and separator.

Figure 2 is a plan of the same.

Similar marks of reference denote the same parts.

The object of our invention is to remove the dust, foreign substances, and light grains from wheat or other grains, and also, if desired, to separate such grains into two or more qualities, thus removing the difficulty heretofore experienced in determining the value of grain when mixed with foreign substances, and when two or more qualities of grain are together.

Our device consists in an adjustable curb, that can be moved nearer to or farther from the point from which the grain falls, to direct the force of a suction-blast upon the grain, when it has acquired more or less accelerated velocity, and we combine therewith an adjustable blast-regulator, by means of which the blast-opening is lessened or increased, and consequently the speed of the blast and its action on the grain are controlled, so as to remove therefrom the foreign matter and light grains, or separate different qualities of grains from each other by the action of the air.

In the drawing, $a$ represents the floor or support for the apparatus; $b$ the outer curb, and $c$ the inner curb, between which are openings, $d\ d$, for the grain to pass away. $e\ e$ are standards sustaining the hopper $f$, and suspending the deflecting-cone $g$, around the edges of which is a ring, $h$, also sustained by the standards $e$. $i$ is an adjustable flaring curb. Setting within the curb $c$ and $k$ is a blast-regulating disk, that can be raised or lowered on the screw $l$.

The amount of grain delivered can be regulated by raising or lowering the hopper $f$, and the grain is spread, by the cone $g$, into a thin sheet, and caused to fall vertically by the ring $h$, and the amount of grain drawn in through the space between the curb $i$ and disk $k$ can be regulated by the volume of the blast exhausted through the curb $i$, in proportion to the space between $i$ and $k$, and the consequent speed of the air; and the vertical adjustment of the curb $i$ and its disk $k$ allows the air to act upon the grain after having acquired the desired accelerated velocity in falling, so that this cleaner and separator can be made to separate different qualities of grain, or take out the foreign matters, and seeds, and imperfect grain, as desired, and the apparatus is very cheaply made, compact, easily kept in order, or adjusted to different characters of grain.

What we claim, and desire to secure by Letters Patent, is—

The adjustable curb $i$, that can be moved towards or away from the point of delivery of the grain, in combination with the adjustable blast-regulator $k$, applied substantially as and for the purposes set forth.

In witness whereof, we have hereunto set our signatures, this eleventh day of February, A. D. 1868.

C. W. MILLS,
LEWIS S. CHICHESTER.

Witnesses:
CHAS. H. SMITH,
GEO. D. WALKER.